US010563882B2

(12) United States Patent
Thomas et al.

(10) Patent No.: US 10,563,882 B2
(45) Date of Patent: *Feb. 18, 2020

(54) DETECTION OF DAMPER MOTOR MECHANICALLY DISCONNECTED FROM DAMPER ASSEMBLY

(71) Applicant: Lennox Industries Inc., Richardson, TX (US)

(72) Inventors: Herman Marcus Thomas, Garland, TX (US); Marcus W. Troxell, Frisco, TX (US); Stephen A. Walter, Flower Mound, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,277

(22) Filed: Dec. 19, 2018

(65) Prior Publication Data

US 2019/0120512 A1  Apr. 25, 2019

Related U.S. Application Data

(60) Continuation of application No. 15/136,567, filed on Apr. 22, 2016, now Pat. No. 10,184,679, which is a division of application No. 14/162,270, filed on Jan. 23, 2014, now Pat. No. 9,335,063.

(51) Int. Cl.
*F24F 13/10* (2006.01)
*F24F 11/30* (2018.01)
*F24F 11/00* (2018.01)
*F24F 13/14* (2006.01)

(52) U.S. Cl.
CPC .............. *F24F 11/30* (2018.01); *F24F 13/10* (2013.01); *F24F 2011/0002* (2013.01); *F24F 2011/0006* (2013.01); *F24F 2013/1433* (2013.01); *F24F 2013/1446* (2013.01); *F24F 2221/32* (2013.01)

(58) Field of Classification Search
CPC ....... F24F 2011/0006; F24F 2013/1433; F24F 2011/0002; F24F 11/30; F24F 2221/32; F24F 13/10
See application file for complete search history.

(56) References Cited

U.S. PATENT DOCUMENTS

| 6,223,544 | B1 | 5/2001 | Seem |
| 6,981,383 | B2 | 1/2006 | Shah et al. |
| 2009/0111373 | A1 | 4/2009 | Hollender et al. |
| 2014/0203090 | A1 | 7/2014 | Edwards et al. |
| 2014/0277773 | A1 | 9/2014 | Goldschmidt et al. |

*Primary Examiner* — David J Teitelbaum
(74) *Attorney, Agent, or Firm* — Winstead PC

(57) ABSTRACT

In an embodiment, a method of testing a HVAC unit for a disconnected damper motor is provided. An outside air section of a damper assembly is closed and air is circulated through the unit. If a discharge air temperature is not substantially equal to a return air temperature, the damper motor is determined to be disconnected. Otherwise, an economizing function having a free cooling target temperature is started. An outside air temperature is compared to the free cooling target temperature. If the outside air temperature is less than the free cooling target temperature, the damper motor is determined to be disconnected if the damper motor has been commanded to fully open the outside air section. If the outside air temperature is not less than the free cooling target temperature, the damper motor is determined to be disconnected if a discharge air temperature is not substantially equal to an outside air temperature.

20 Claims, 4 Drawing Sheets

DETECTION OF DAMPER MOTOR MECHANICALLY DISCONNECTED FROM DAMPER ASSEMBLY

CROSS REFERENCE TO RELATED APPLICATIONS

This application is a continuation of U.S. patent application Ser. No. 15/136,567, filed on Apr. 22, 2016. U.S. patent application Ser. No. 15/136,567 is a divisional of U.S. patent application Ser. No. 14/162,270, filed on Jan. 23, 2014. U.S. patent application Ser. No. 15/136,567 and U.S. patent application Ser. No. 14/162,270 are incorporated herein by reference.

FIELD OF THE INVENTION

This application relates to HVAC dampers and, more particularly, to HVAC damper motors.

BACKGROUND

Damper assemblies are a common part of Heating, Ventilation, and Air Conditioning (HVAC) units. A damper assembly may have two parts: an outdoor air section which opens to receive outdoor air from outside the building, and a return air section which opens to receive return air from inside the building. Opening one section of the damper assembly may close the other section and vice versa.

A HVAC unit controller adjusts a damper assembly to optimize energy use. For example, suppose a HVAC unit is cooling a building, and the outdoor air is cooler than the air inside the building. It is more efficient for the HVAC unit to condition the outdoor air than to condition the return air. Thus, the outdoor air section should be open at least partially. An opportunity to save energy would be wasted if the outdoor air were kept out of the HVAC unit. Using outside air to cool the building in this manner is known as "free cooling."

Similarly, when cooling during hot outdoor weather or heating during cold outdoor weather, it is more efficient for the HVAC unit to condition the return air. The outdoor air section should be closed and the return air section should be opened. Otherwise, the HVAC unit would waste energy cooling or heating the outdoor air instead of the more suitable return air.

A damper drive train opens and closes the sections of the damper assembly. A damper motor moves the damper drive train. The HVAC unit controller sends command signals to the damper motor to control the movement of the damper motor.

It is possible for the damper motor to become mechanically disconnected from the damper assembly and damper drive train. When the damper motor is disconnected, the HVAC unit controller command signals cannot open or close the sections of the damper assembly.

Energy savings can be missed if the outdoor air section is left closed due to the disconnection. The HVAC unit may be missing the opportunity to utilize outdoor air which is more suitable for cooling than return air. Likewise, energy can be wasted if the outdoor air section is left open due to the disconnection, because the HVAC unit may unnecessarily heat or cool the less suitable outdoor air instead of the return air.

Conventionally, a disconnected damper motor is discovered, if ever, by an onsite technician visually inspecting the operation of the damper assembly. The HVAC unit may operate for a significant amount of time before a technician discovers the disconnection. It would be desirable if a HVAC unit could detect a disconnected damper motor automatically. The disconnected damper motor could be repaired more quickly, allowing the HVAC unit to resume moving the damper assembly.

SUMMARY

In an embodiment, a method of testing a HVAC unit for a disconnected damper motor is provided. An outside air section of a damper assembly is closed and air is circulated through the unit. If a discharge air temperature is not substantially equal to a return air temperature, the damper motor is determined to be disconnected. Otherwise, an economizing function having a free cooling target temperature is started. An outside air temperature is compared to the free cooling target temperature. If the outside air temperature is less than the free cooling target temperature, the damper motor is determined to be disconnected if the damper motor has been commanded to fully open the outside air section. If the outside air temperature is not less than the free cooling target temperature, the damper motor is determined to be disconnected if a discharge air temperature is not substantially equal to an outside air temperature.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DESCRIPTION OF DRAWINGS

For a more complete understanding of the present invention, reference is now made to the following descriptions taken in conjunction with the accompanying drawings, in which.

DETAILED DESCRIPTION

In the following discussion, numerous specific details are set forth to provide a thorough explanation. However, such specific details are not essential. In other instances, well-known elements have been illustrated in schematic or block diagram form. Additionally, for the most part, specific details within the understanding of persons of ordinary skill in the relevant art have been omitted.

Figure 1A:
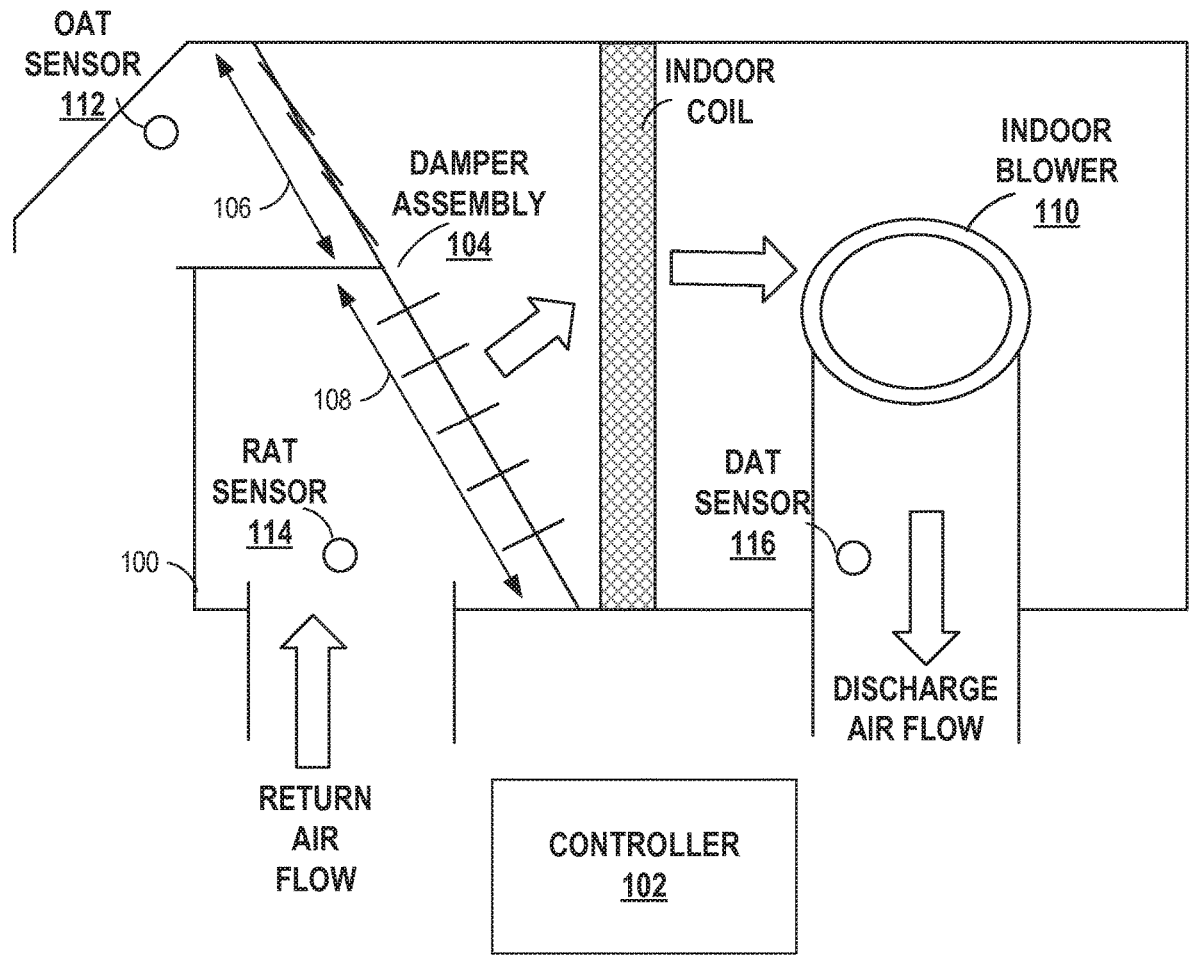
FIG. 1A depicts a HVAC unit with the outside air section of the damper assembly closed.
Figure 1B:
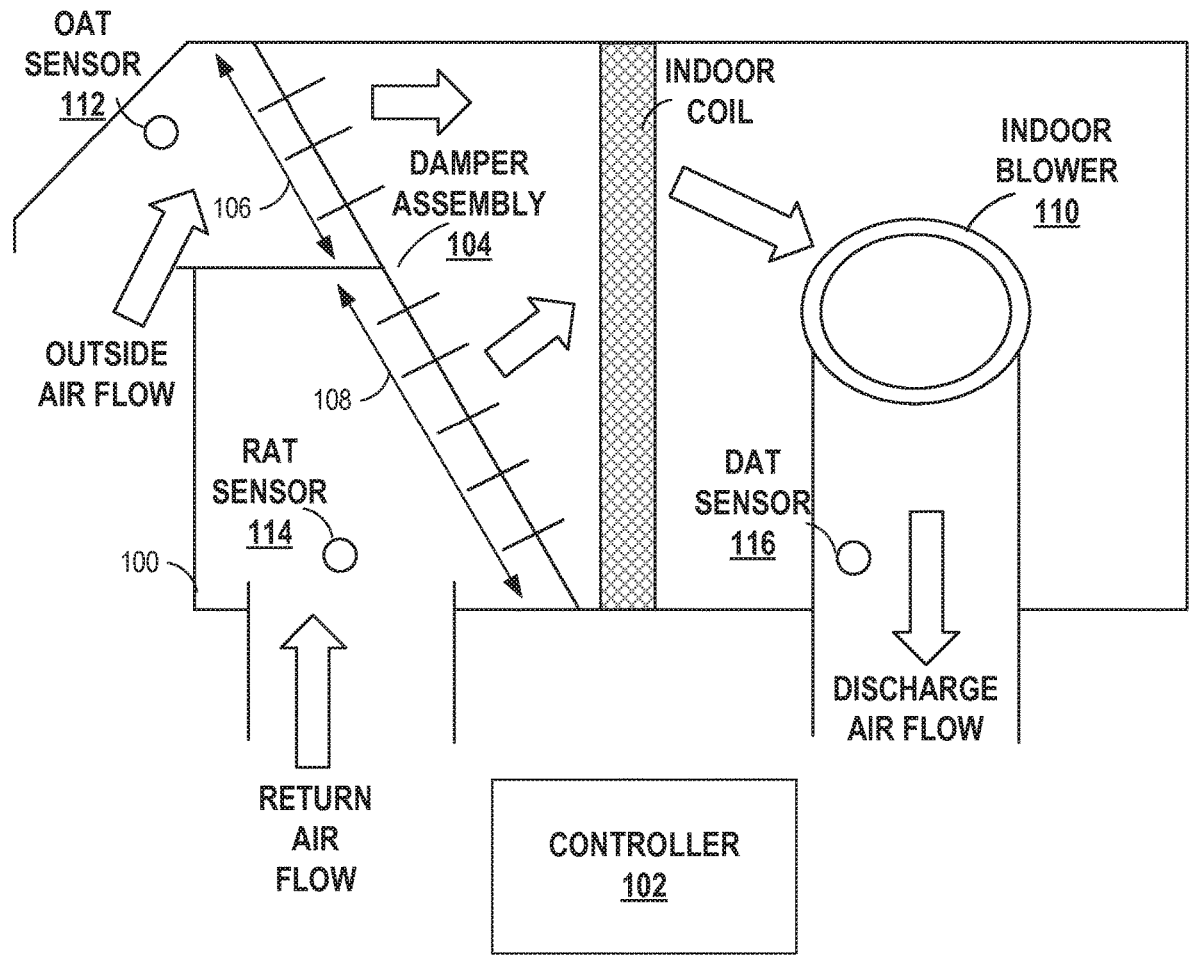
FIG. 1B depicts a HVAC unit with the outside air section and the return air section of the damper assembly both partially open.

Referring to FIGS. 1A and 1B, depicted is a Heating, Ventilation, and Air Conditioning (HVAC) unit 100 including controller 102. HVAC unit 100 has damper assembly 104. Damper assembly 104 comprises outside air section 106 and return air section 108. Outside air section 106 and return air section 108 may be composed of blades which can be opened and closed to control airflow. Outside air section 106, when open, receives air from outside the building. Return air section 108, when open, receives air returned from inside the building.

HVAC unit 100 has indoor blower 110. Indoor blower 110 pulls air from the building and pushes air into the building.

HVAC unit 100 also has a refrigerant system which can mechanically cool air flowing through the unit. This air in turn cools the building. HVAC unit 100 may use mechanical cooling as an alternative to or in addition to free cooling.

HVAC unit 100 also contains sensors that can sense air temperatures related to cooling the building. These sensors include temperature sensors 112, 114, and 116. Outside air temperature (OAT) sensor 112 measures the temperature of the outside air that outside air section 106 would receive if open. Return air temperature (RAT) sensor 114 measures the temperature of the return air that return air section 108 would receive if open. Discharge air temperature (DAT) sensor 116 measures the temperature of air being discharged from HVAC unit 100 into the building.

Generally speaking, a building thermostat or building energy management system informs controller 102 on the cooling needs of the building, and controller 102 instructs HVAC unit 100 on how to respond to those cooling needs. HVAC unit 100 may be referred to as a Roof-Top Unit (RTU). However, unit 100 is not necessarily located on a rooftop.

A damper drive train moves sections 106 and 108 in opposite directions. For example, when the blades of outside air section 106 are completely closed, return air section 108 is completely open, and vice versa. When outdoor air section 106 is completely closed, no outdoor air may flow through outside air section 106, and the maximum amount of return air may flow through return air section 108. When return air section 108 is completely closed, no return air may flow through return air section 108, and the maximum amount of outdoor air may flow through outdoor air section 106. Outside air section 106 is completely closed in FIG. 1A.

As one section gradually opens, the other section gradually closes. When both sections are partially open, air flows through both sections of damper assembly 104. Outside air section 106 and return air section 108 are both partially open in FIG. 1B.

HVAC unit 100 has a Free Cooling Target Temperature variable that controls the operation of the damper assembly. If the discharge air temperature is below the Free Cooling Target Temperature. HVAC unit 100 closes outside air section 106 at least partially. If the discharge air temperature is above the Free Cooling Target Temperature. HVAC unit 100 opens outside air section 106 fully. In an embodiment, this free cooling target temperature is 55 degrees Fahrenheit.

The damper drive train is mechanically attached to a damper motor. Controller 102 commands the damper motor to move to a specified position. The damper motor responds to the command with a feedback signal communicating the position of the damper motor as the drive train open or closes damper assembly 104. When the damper motor is disconnected from the damper drive train, controller 102 command signals to the damper motor do not move damper assembly 104. HVAC unit 100 may operate inefficiently as previously mentioned. However, the damper motor may still move and the feedback signal may still change to communicate the position of the damper motor.

Using the damper motor, indoor blower 110, and sensors 112, 114, and 116, controller 102 may perform an automatic test that determines if the damper motor is disconnected. Computer-readable instructions for performing the test may be provided to controller 102 as part of its firmware. By performing the test periodically, controller 102 may automatically discover a disconnected damper motor.

Figure 2:
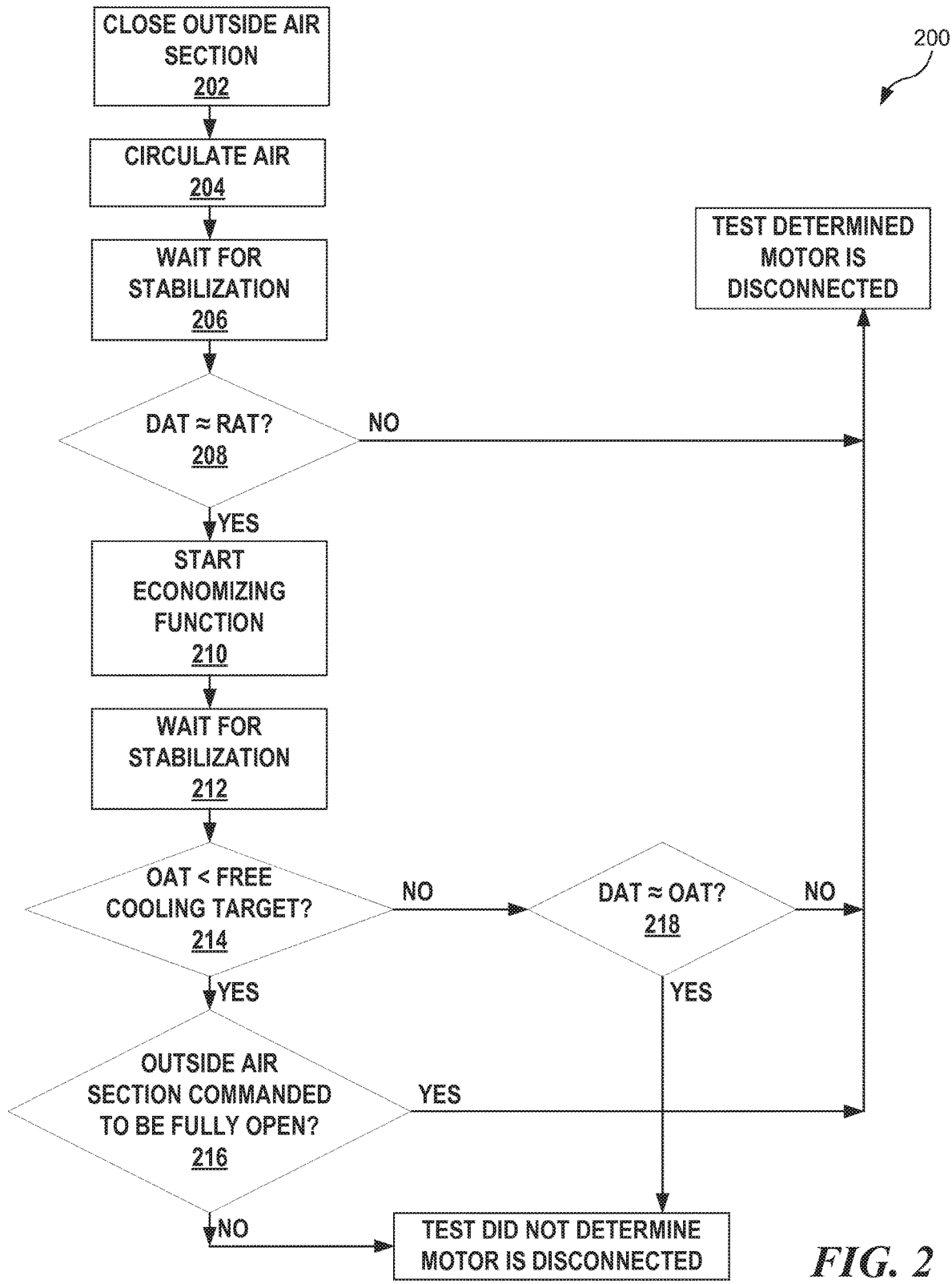
FIG. 2 depicts a test for determining if a damper motor is disconnected in accordance with an exemplary embodiment of the present invention.

Referring to FIG. 2, depicted is a test 200 for determining if the damper motor is disconnected. Test 200 may be performed when (1) the outside air is determined to be acceptable for free cooling and (2) a temperature difference above a certain temperature preset value exists between the outside air temperature and the return air temperature. The temperature preset value is preferably between 5 and 10 degrees Fahrenheit.

Test 200 is preferably performed at the initiation of the Pre-Cool operation mode of HVAC unit 100. When the Pre-Cool mode is enabled by a user, controller 102 initiates the Pre-Cool mode in response to the first cooling demand of the building after night setback. Night setback is the time when the building goes from unoccupied to occupied status. In the Pre-Cool mode, controller 102 conserves energy by using free cooling and not mechanical cooling.

At 202, controller 102 signals the damper motor to hold outside air section 106 closed and return air section 108 open. At 204, controller 102 signals indoor blower 110 to circulate air through HVAC unit 100. At 206, controller 102 waits for a stabilization period, for example five minutes. The stabilization period is preferably long enough for air to flow across return air temperature sensor 114, through unit 100, and across discharge air temperature sensor 116.

At 208, controller 102 compares the discharge air temperature from discharge air temperature sensor 116 with the return air temperature from return air temperature sensor 114. If outside air section 106 is closed, the discharge air temperature should be substantially equal to the return air temperature. Otherwise, the damper motor is disconnected.

Due to factors such as temperature sensor accuracy and warming of the air as it flows past the motor of indoor blower 110, the return air temperature and discharge air temperature may be close but not exactly equal even when outside air section 106 is fully closed. The return air temperature and discharge air temperature may be considered substantially equal when the difference between them is below a comparison threshold. The comparison threshold may be the temperature preset value.

It is possible for the damper motor to still be disconnected when the discharge air temperature and return air temperature are approximately equal. For example, the damper motor could have become disconnected when outside air section 106 was already closed. Thus, additional testing is necessary.

At 210, controller 102 starts its economizing function. Controller 102 adjusts damper assembly 104 to attempt to achieve the Free Cooling Target Temperature as the discharge air temperature. In other words, controller 102 moves damper assembly 104 as necessary to raise and lower the discharge air temperature. Controller 102 attempts to keep the discharge air temperature as close as possible to the Free Cooling Target Temperature.

During the economizing function, HVAC unit 100 performs no mechanical cooling. Because the outside air is suitable for free cooling, outside air section 106 should be at least partially open during the economizing function.

At 212, controller 102 waits for a second stabilization period while the economizing function continues. As an example, this second stabilization period could be five minutes. This second stabilization period is preferably long enough for the damper motor to reach its target position and stop moving, and then for air to flow across sensors 112 and/or 114 (depending on the position of damper assembly 104), through unit 100, and across discharge air temperature sensor 116.

At 214, controller 102 determines if the outside air temperature is less than the free cooling target temperature. If the outside air temperature is less than the free cooling target temperature, test 200 proceeds to 216. If the outside air temperature is greater than or equal to the free cooling target temperature, test 200 proceeds to 218. 216 and 218 detect a damper motor which became disconnected when outside air section 106 was closed or mostly closed. A damper motor which became disconnected when outside air section 106 was open would have been detected at 208.

At 216, if the outside air temperature is less than the free cooling target temperature, the economizing function should have closed outside air section 106 at least partially. However, if the damper motor is disconnected with outside air section 106 closed or mostly closed, the discharge air temperature will be substantially equal to the return air temperature. This return air temperature is ordinarily higher than the free cooling target temperature.

The economizing function will therefore attempt to reduce the discharge air temperature, continually commanding the damper motor to open outside air section 106 further. Eventually, at least after the second stabilization period at 212, the economizing function will have commanded the damper motor to fully open outside air section 106. Consequently, the feedback signal from the damper motor will indicate outside air section 106 is fully open, though damper assembly 104 will not have moved due to the disconnected damper motor.

Therefore, at 216, if outside air section 106 has been commanded to be fully open according to the feedback signal from the damper motor, test 200 determines the damper motor is disconnected from the damper drive train. Otherwise, test 200 does not determine the damper motor is disconnected.

At 218, if the outside air temperature is greater than the free cooling target temperature, the economizing function should have fully opened outside air section 106. Due to the fully open outside air section 106, the discharge air temperature from discharge air temperature sensor should be substantially equal to the outside air temperature from outside air temperature sensor 112. If the discharge air temperature and the outside air temperature are not substantially equal, test 200 determines the damper motor is disconnected from the damper drive train. Otherwise, test 200 does not determine the damper motor is disconnected. Again, the two temperatures need not necessarily be exactly equal to be substantially equal. Instead, their difference can be below a threshold, and the threshold can be the temperature preset value.

Both 214 and 218 use an outside air temperature reading from outside air temperature sensor 112. Because the outside air temperature is unlikely to change meaningfully between 214 and 218, the same outside air temperature reading may be used at 214 and reused at 218. Alternately, a new outside air temperature reading may be obtained and used for 218.

Figure 3:
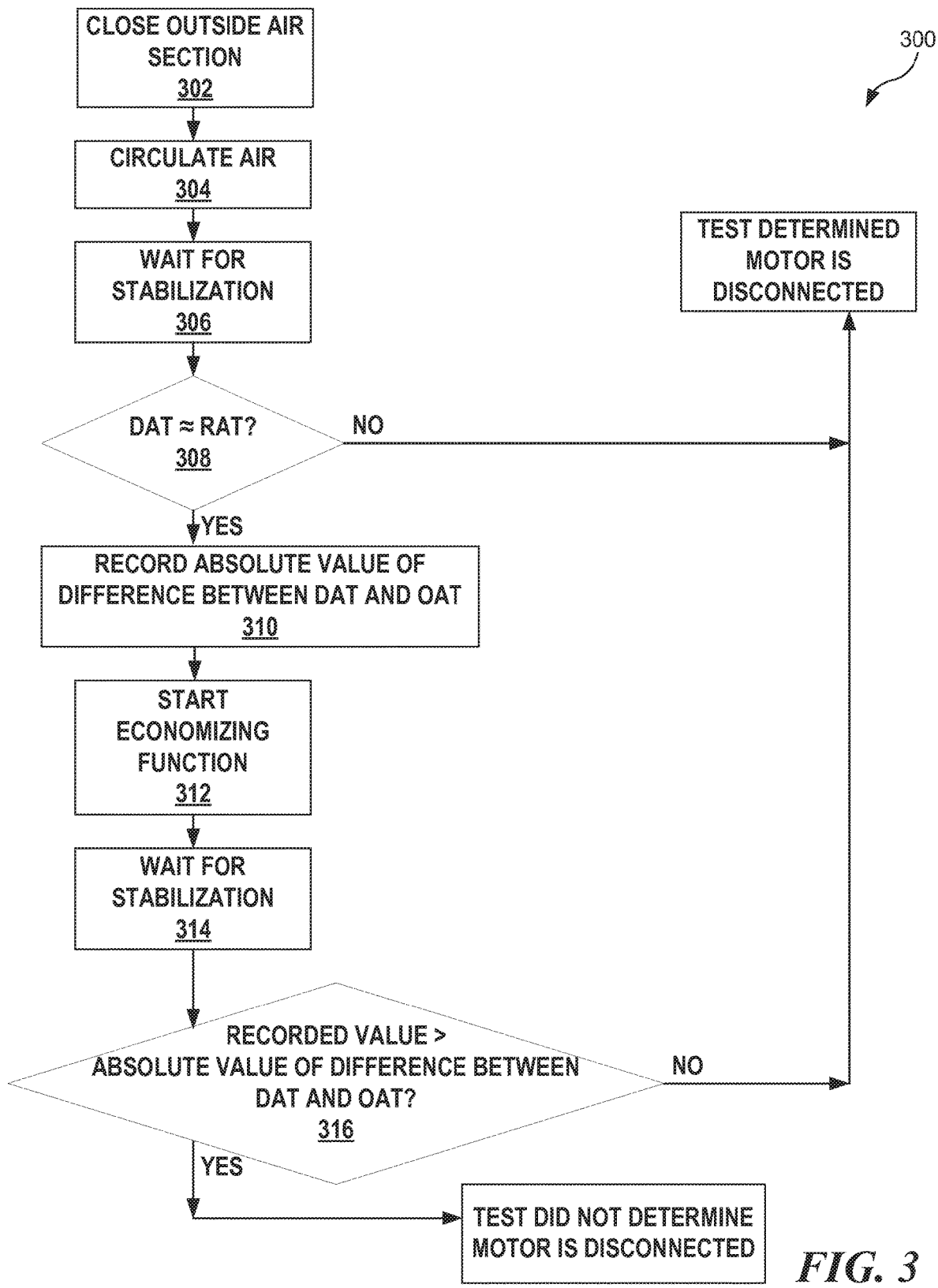
FIG. 3 depicts an alternate test for determining if a damper motor is disconnected in accordance with an exemplary embodiment of the present invention.

Referring to FIG. 3, depicted is an alternate test 300 for determining if the damper motor is disconnected. Test 300 may be performed in place of test 200. Like test 200, test 300 may be performed when (1) the outside air is determined to be acceptable for free cooling and (2) a temperature difference above a certain temperature preset value exists between the outside air temperature and the return air temperature. Again, the temperature preset value is preferably between 5 and 10 degrees Fahrenheit. During test 300, all mechanical cooling and any installed heating (gas or electric) by HVAC unit 100 is off.

At 302, controller 102 commands the damper motor to close outside air section 106, then controller 102 waits for the damper motor feedback signal to indicate outside air section 106 is closed. At 304, controller 102 turns on indoor blower 110. Indoor blower 110 circulates air through the unit as shown in FIG. 1A. At 306, controller 102 waits for a stabilization period to pass. The stabilization period may be five minutes. The stabilization period is preferably long enough for air to flow across return air temperature sensor 114, through unit 100, and across discharge air temperature sensor 116.

At 308, controller 102 compares the discharge air temperature from discharge air temperature 116 to the return air temperature from return air temperature sensor 114. If the return air temperature and discharge air temperature are not substantially equal, test 300 determines the damper motor is disconnected. Otherwise, outdoor air section 106 is properly closed.

At 310, while indoor blower 110 continues to circulate the air, controller 102 records the absolute value of the difference between the discharge air temperature and the outside air temperature. At 312, controller 102 starts its economizing function. Because the outside air is suitable for free cooling, outside air section 106 should be at least partially open during the economizing function. At 314, controller 102 waits for a second stabilization period, which again may be five minutes. This second stabilization period is preferably long enough for the damper motor to reach its target position and stop moving, and then for air to flow across sensors 112 and/or 114 (depending on the position of damper assembly 104), through unit 100, and across discharge air temperature sensor 116.

At 316, controller 102 determines the absolute value of the difference between the discharge air temperature and the outside air temperature. If the damper motor is not disconnected, the damper motor opened outside air section 106. The absolute value recorded at 310 should therefore be greater than the absolute value determined at 316. If the absolute value recorded at 310 is less than or equal to the absolute value determined at 316, test 300 determines the damper motor is disconnected. Otherwise, test 300 does not determine the damper motor is disconnected.

Both 310 and 316 use an outside air temperature reading from outside air temperature sensor 112. Because the outside air temperature is unlikely to change meaningfully between 310 and 316, the same outside air temperature reading may be used at 310 and reused at 316. Alternately, a new outside air temperature reading may be obtained and used for 316.

If test 200 or test 300 determines the damper motor is disconnected, unit 100 may generate an alarm code. The alarm code may be an indication the damper motor is disconnected. The alarm code may be displayed on a screen of controller 102. If controller 102 is connected to a central energy or building management system, the alarm code may also be transmitted from controller 102 to that system. The purpose of the alarm code is to notify a person that the damper motor must be reconnected.

It is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of various embodiments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of determining a disconnected damper motor of a Heating, Ventilation, and Air Conditioning (HVAC) system, the method comprising:
providing, by a controller, a signal to a damper assembly of the HVAC system to close an outside air section and open a return air section;
comparing, by the controller, a discharge air temperature to a return air temperature;
responsive to a determination that the discharge air temperature is substantially equal to the return air temperature, recording, by the controller, a first absolute value;
starting, by the controller, an economizing function of the HVAC system, the economizing function comprising a free cooling target temperature;
comparing, by the controller, the first absolute value to a second absolute value; and
responsive to a determination that the first absolute value is not greater than the second absolute value, generating, by the controller, an indication that a damper motor is disconnected.

2. The method according to claim 1, wherein the first absolute value comprises a difference between a first comparison discharge air temperature and a first comparison outside air temperature.

3. The method according to claim 2, wherein the second absolute value comprises a difference between a second comparison discharge air temperature and a second comparison outside air temperature.

4. The method according to claim 1, further comprising:
responsive to a determination that the discharge air temperature is not substantially equal to the return air temperature, determining, by the controller, that the damper motor is disconnected from the damper assembly.

5. The method according to claim 1, wherein the economizing function comprises adjusting the damper assembly to make the temperature of air discharged from the HVAC system equal to the free cooling target temperature.

6. The method according to claim 3, wherein the first comparison outside air temperature is reused as the second comparison outside air temperature.

7. The method according to claim 3, wherein the first comparison outside air temperature is not reused as the second comparison outside air temperature.

8. The method according to claim 1, further comprising, after starting the economizing function, waiting for a stabilization period.

9. A heating, ventilation, and air conditioning (HVAC) system comprising:
a controller that is configured to:
provide a signal to a damper assembly of the HVAC system to close an outside air section and open a return air section;
compare a discharge air temperature to a return air temperature;
responsive to a determination that the discharge air temperature is substantially equal to the return air temperature, record a first absolute value;
start an economizing function of the HVAC system, the economizing function comprising a free cooling target temperature;
compare the first absolute value to a second absolute value; and
responsive to a determination that the first absolute value is not greater than the second absolute value, generate an indication that a damper motor is disconnected.

10. The HVAC system of claim 9, wherein the first absolute value comprises a difference between a first comparison discharge air temperature and a first comparison outside air temperature.

11. The HVAC system of claim 10, wherein the second absolute value comprises a difference between a second comparison discharge air temperature and a second comparison outside air temperature.

12. The HVAC system of claim 9, wherein the controller is further configured to:
responsive to a determination that the discharge air temperature is not substantially equal to the return air temperature, determine that the damper motor is disconnected from the damper assembly.

13. The HVAC system of claim 9, wherein the economizing function comprises adjusting the damper assembly to make the temperature of air discharged from the HVAC system equal to the free cooling target temperature.

14. The HVAC system of claim 11, wherein the first comparison outside air temperature is reused as the second comparison outside air temperature.

15. The HVAC system of claim 11, wherein the first comparison outside air temperature is not reused as the second comparison outside air temperature.

16. A heating, ventilation, and air conditioning (HVAC) system comprising:
a controller that is configured to:
provide a signal to a damper assembly of the HVAC system to close an outside air section and open a return air section;
compare a discharge air temperature to a return air temperature;

responsive to a determination that the discharge air temperature is substantially equal to the return air temperature, record a first absolute value;

start an economizing function of the HVAC system, the economizing function comprising a free cooling target temperature;

compare the first absolute value to a second absolute value; and responsive to a determination that the first absolute value is greater than the second absolute value, determine that a damper motor is not disconnected.

17. The HVAC system of claim 16, further comprising:
responsive to a determination that the first absolute value is not greater than the second absolute value, generate an indication that the damper motor is disconnected.

18. The HVAC system of claim 16, wherein the first absolute value comprises a difference between a first comparison discharge air temperature and a first comparison outside air temperature.

19. The HVAC system of claim 18, wherein the second absolute value comprises a difference between a second comparison discharge air temperature and a second comparison outside air temperature.

20. The HVAC system of claim 16, wherein the economizing function comprises adjusting the damper assembly to make the temperature of air discharged from the HVAC system equal to the free cooling target temperature.

* * * * *